US010503648B2

(12) United States Patent
Kalyanasundharam et al.

(10) Patent No.: US 10,503,648 B2
(45) Date of Patent: Dec. 10, 2019

(54) CACHE TO CACHE DATA TRANSFER ACCELERATION TECHNIQUES

(71) Applicant: Advanced Micro Devices, Inc., Sunnyvale, CA (US)

(72) Inventors: Vydhyanathan Kalyanasundharam, San Jose, CA (US); Amit P. Apte, Austin, TX (US); Ganesh Balakrishnan, Austin, TX (US); Ann Ling, Folsom, CA (US); Ravindra N. Bhargava, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 73 days.

(21) Appl. No.: 15/839,662

(22) Filed: Dec. 12, 2017

(65) Prior Publication Data

US 2019/0179758 A1    Jun. 13, 2019

(51) Int. Cl.
*G06F 12/00* (2006.01)
*G06F 12/0862* (2016.01)
*G06F 12/0811* (2016.01)
*G06F 12/0831* (2016.01)
*G06F 12/084* (2016.01)

(52) U.S. Cl.
CPC ........ *G06F 12/0862* (2013.01); *G06F 12/084* (2013.01); *G06F 12/0811* (2013.01); *G06F 12/0831* (2013.01); *G06F 2212/602* (2013.01); *G06F 2212/62* (2013.01)

(58) Field of Classification Search
None
See application file for complete search history.

(56) References Cited

U.S. PATENT DOCUMENTS

| 5,303,362 A | 4/1994 | Butts, Jr. et al. |
| 5,412,788 A | 5/1995 | Collins et al. |
| 5,517,494 A | 5/1996 | Green |
| 5,537,575 A | 7/1996 | Foley et al. |
| 5,560,038 A | 9/1996 | Haddock |
| 5,659,708 A | 8/1997 | Arimilli et al. |
| 5,673,413 A | 9/1997 | Deshpande et al. |
| 5,684,977 A | 11/1997 | Van Loo et al. |
| 5,749,095 A | 5/1998 | Hagersten |
| 5,859,983 A | 1/1999 | Heller et al. |
| 5,878,268 A | 3/1999 | Hagersten |

(Continued)

*Primary Examiner* — John A Lane
(74) *Attorney, Agent, or Firm* — Meyertons Hood Kivlin Kowert and Goetzel PC; Rory D. Rankin (57) ABSTRACT

Systems, apparatuses, and methods for accelerating cache to cache data transfers are disclosed. A system includes at least a plurality of processing nodes and prediction units, an interconnect fabric, and a memory. A first prediction unit is configured to receive memory requests generated by a first processing node as the requests traverse the interconnect fabric on the path to memory. When the first prediction unit receives a memory request, the first prediction unit generates a prediction of whether data targeted by the request is cached by another processing node. The first prediction unit is configured to cause a speculative probe to be sent to a second processing node responsive to predicting that the data targeted by the memory request is cached by the second processing node. The speculative probe accelerates the retrieval of the data from the second processing node if the prediction is correct.

18 Claims, 9 Drawing Sheets

(56) References Cited

U.S. PATENT DOCUMENTS

| | | |
|---|---|---|
| 5,887,138 A | 3/1999 | Hagersten et al. |
| 5,893,144 A | 4/1999 | Wood et al. |
| 5,924,118 A | 7/1999 | Arimilli et al. |
| 5,966,729 A | 10/1999 | Phelps |
| 5,987,544 A | 11/1999 | Bannon et al. |
| 5,991,819 A | 11/1999 | Young |
| 6,012,127 A | 1/2000 | McDonald et al. |
| 6,018,791 A | 1/2000 | Arimilli et al. |
| 6,038,644 A | 3/2000 | Irie et al. |
| 6,049,851 A | 4/2000 | Bryg et al. |
| 6,070,231 A | 5/2000 | Ottinger |
| 6,085,263 A | 7/2000 | Sharma et al. |
| 6,098,115 A | 8/2000 | Eberhard et al. |
| 6,101,420 A | 8/2000 | VanDoren et al. |
| 6,108,737 A | 8/2000 | Sharma et al. |
| 6,108,752 A | 8/2000 | Van Doren et al. |
| 6,112,281 A | 8/2000 | Bamford et al. |
| 6,138,218 A | 10/2000 | Arimilli et al. |
| 6,199,153 B1 | 3/2001 | Razdan et al. |
| 6,209,065 B1 | 3/2001 | Van Doren et al. |
| 6,249,846 B1 | 6/2001 | Van Doren et al. |
| 6,275,905 B1 | 8/2001 | Keller et al. |
| 6,286,090 B1 | 9/2001 | Steely, Jr. et al. |
| 6,292,705 B1 | 9/2001 | Wang et al. |
| 6,295,583 B1 | 9/2001 | Razdan et al. |
| 6,370,621 B1 | 4/2002 | Keller |
| 6,631,401 B1 | 10/2003 | Keller et al. |
| 6,865,595 B2 * | 3/2005 | Glasco ............... G06F 12/0815 709/206 |
| 2008/0243739 A1* | 10/2008 | Tsien ................ G06F 12/0826 706/21 |
| 2014/0281384 A1* | 9/2014 | Zeng ................. G06F 9/30043 712/42 |
| 2017/0286119 A1* | 10/2017 | Al Sheikh .......... G06F 9/30043 |
| 2019/0065384 A1* | 2/2019 | Al Sheikh .......... G06F 12/0811 |

\* cited by examiner

CACHE TO CACHE DATA TRANSFER ACCELERATION TECHNIQUES

BACKGROUND

Description of the Related Art

Computer systems use main memory that is typically formed with inexpensive and high density dynamic random access memory (DRAM) chips. However DRAM chips suffer from relatively long access times. To improve performance, data processors typically include at least one local, high-speed memory known as a cache. In a multi-core data processor, each data processor core can have its own dedicated level one (L1) cache, while other caches (e.g., level two (L2), level three (L3) are shared by data processor cores.

Cache subsystems in a computing system include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block is varied according to design choice, and can be of any size. In addition, each of the terms "cache tag", "cache line tag", and "cache block tag" is interchangeable.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

Transferring data between the cache subsystem of a first node to the cache subsystem of a second node typically involves multiple operations, with each operation contributing to the latency of the transfer. These operations are typically performed in a serial fashion, with one operation starting when the previous operation ends. Cache to cache data transfer latency is an important aspect of performance especially in a distributed memory architecture with variable latency to memory.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for accelerating cache to cache data transfers are disclosed herein. In one embodiment, a system includes at least a plurality of processing nodes (e.g., central processing units (CPUs)), a plurality of prediction units, an interconnect fabric, and a memory. Each processing node includes one or more processing units. The type of processing unit(s) ((e.g., general purpose processor, graphics processing unit (GPU), application specific integrated circuit (ASIC), field programmable gate array (FPGA), digital signal processor (DSP)) included in each processing node can vary from embodiment to embodiment and from node to node. A first prediction unit coupled to a first processing node is configured to receive memory requests generated by the first processing node as the requests traverse the interconnect fabric on the path to memory. When the first prediction unit receives a memory request, the first prediction unit generates a prediction of whether data targeted by the request resides in a cache subsystem of another processing node of the plurality of processing nodes. The first prediction unit is configured to cause a speculative probe to be sent to a second processing node responsive to predicting that the data targeted by the memory request resides in a cache subsystem of the second processing node. The speculative probe causes the data to be retrieved from the second processing node, earlier than otherwise, if the prediction is correct.

In one embodiment, each interconnect fabric unit (e.g., coherent master) connected to a CPU includes a prediction unit to determine whether a new request is likely to hit in another CPU's cache. The prediction unit makes predictions based on tracking previous data transfers back to the requester CPU and from information retrieved from a cache directory. On a predicted hit, a speculative probe is launched to the relevant CPU cache in parallel with the launch of the request to the home node memory controller. As used herein, launching the speculative probe in "parallel" with the request to the home node generally means the speculative probe and request are conveyed either at the same time or relatively close in time to one another (in the case that one precedes the other). The target coherent master then probes the CPU cache subsystem to initiate an early retrieval of the data. The data which is retrieved can be stored in the coherent master till either the demand probe arrives or dropped based on a timer or victimized to memory.

If the prediction was correct, the demand probe for the request would reach the target CPU cache and hit on the data that has either been retrieved or is in the process of being retrieved from the CPU cache subsystem. The demand probe can then return the data back to the requester. This overlaps the CPU probe response with the transport and directory lookup latency. If the prediction was wrong, depending on the probe action of the speculative probe, the target coherent master would either sink the data to memory or discard the data. This mechanism can help with migratory patterns and various producer/consumer or ping/pong workloads.

Figure 1:
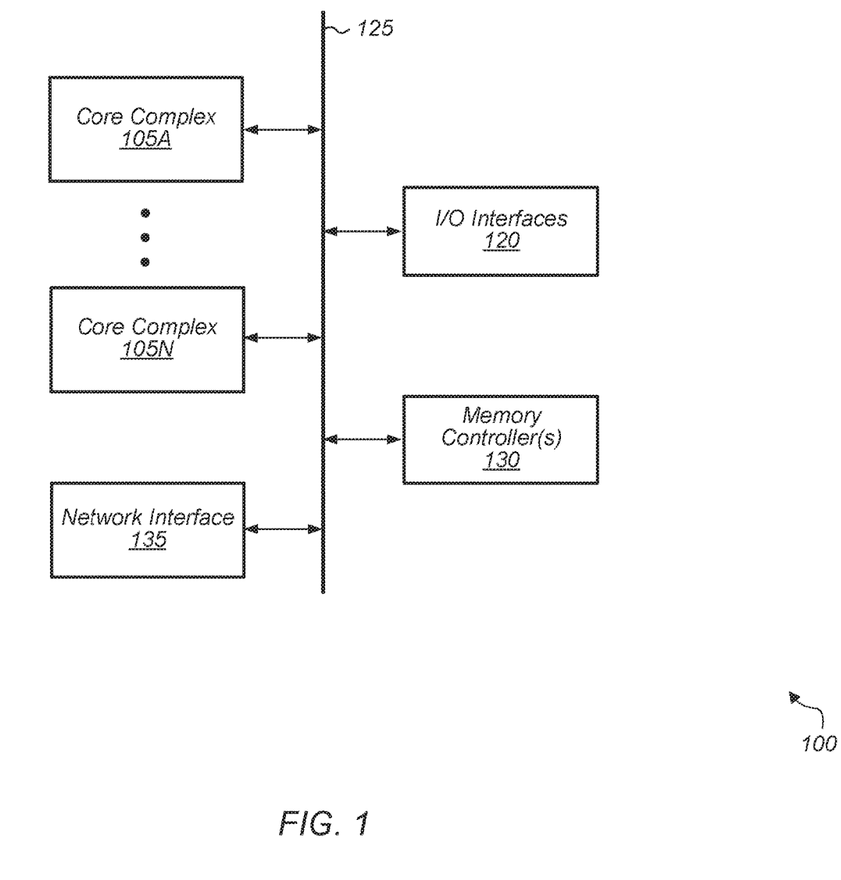
FIG. 1 is a block diagram of one embodiment of a computing system.

Referring now to FIG. 1, a block diagram of one embodiment of a computing system 100 is shown. In one embodiment, computing system 100 includes at least core complexes 105A-N, input/output (I/O) interfaces 120, bus 125, memory controller(s) 130, and network interface 135. In other embodiments, computing system 100 can include other components and/or computing system 100 can be arranged differently. In one embodiment, each core complex 105A-N includes one or more general purpose processors, such as central processing units (CPUs). It is noted that a "core complex" can also be referred to as a "processing node" or a "CPU" herein. In some embodiments, one or more core complexes 105A-N can include a data parallel processor with a highly parallel architecture. Examples of data parallel processors include graphics processing units (GPUs), digital signal processors (DSPs), and so forth. Each processor core within core complex 105A-N includes a cache subsystem with one or more levels of caches. In one embodiment, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a server, computer, laptop, mobile device, game console, streaming device, wearable device, or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
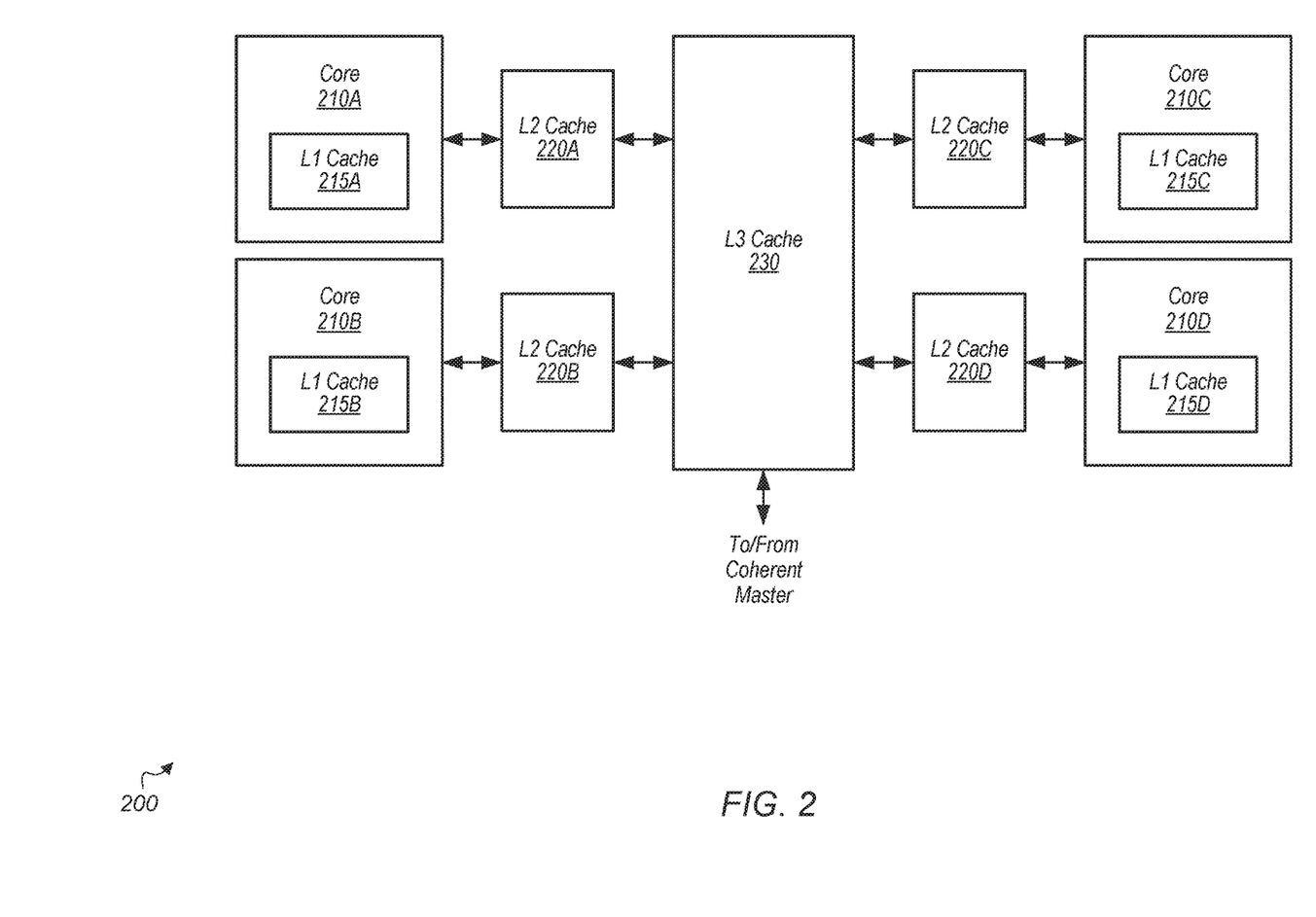
FIG. 2 is a block diagram of one embodiment of a core complex.

Turning now to FIG. 2, a block diagram of one embodiment of a core complex 200 is shown. In one embodiment, core complex 200 includes four processor cores 210A-D. In other embodiments, core complex 200 can include other numbers of processor cores. It is noted that a "core complex" can also be referred to as a "processing node" or "CPU" herein. In one embodiment, the components of core complex 200 are included within core complexes 105A-N (of FIG. 1).

Each processor core 210A-D includes a cache subsystem for storing data and instructions retrieved from the memory subsystem (not shown). For example, in one embodiment, each core 210A-D includes a corresponding level one (L1) cache 215A-D. Each processor core 210A-D can include or be coupled to a corresponding level two (L2) cache 220A-D. Additionally, in one embodiment, core complex 200 includes a level three (L3) cache 230 which is shared by the processor cores 210A-D. L3 cache 230 is coupled to a coherent master for access to the fabric and memory subsystem. It is noted that in other embodiments, core complex 200 can include other types of cache subsystems with other numbers of cache and/or with other configurations of the different cache levels.

Figure 3:
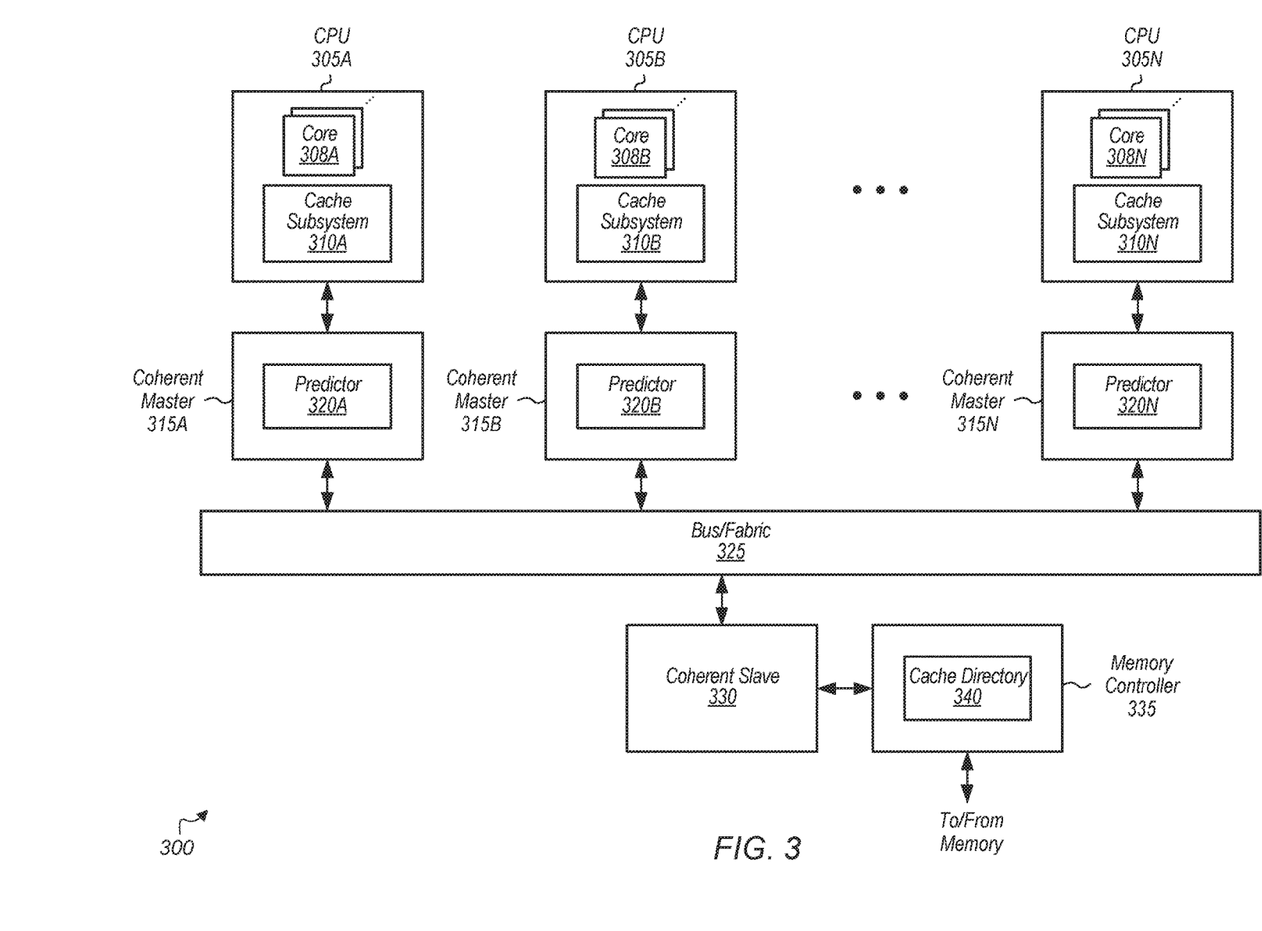
FIG. 3 is a block diagram of one embodiment of a multi-CPU system.

Referring now to FIG. 3, a block diagram of one embodiment of a multi-CPU system 300 is shown. In one embodiment, system includes multiple CPUs 305A-N. The number of CPUs per system can vary from embodiment to embodiment. Each CPU 305A-N can include any number of cores 308A-N, respectively, with the number of cores varying according to the embodiment. Each CPU 305A-N also includes a corresponding cache subsystem 310A-N. Each cache subsystem 310A-N can include any number of levels of caches and any type of cache hierarchy structure.

In one embodiment, each CPU 305A-N is connected to a corresponding coherent master 315A-N. As used herein, a "coherent master" is defined as an agent that processes traffic flowing over an interconnect (e.g., bus/fabric 325) and manages coherency for a connected CPU. To manage coherency, a coherent master receives and processes coherency-related messages and probes and generates coherency-related requests and probes. It is noted that a "coherent master" can also be referred to as a "coherent master unit" herein. Each coherent master 315A-N includes a corresponding predictor 320A-N. It is noted that a "predictor" can also be referred to as a "prediction unit" herein.

Each predictor 320A-N is configured to determine whether a memory request received from its locally connected CPU 305 is likely to hit in another CPU's cache subsystem. For example, in one embodiment, each predictor 320A-N includes a table with entries for the different memory regions being accessed by the applications executing on its corresponding local CPU 305. The size of the regions being tracked can vary from embodiment to embodiment. For example, in one embodiment, each entry in the table tracks a single cache line. In another embodiment, each entry in the table tracks a region which includes multiple cache lines. The entry for a given region can have a prediction of where the data resides and a confidence field to indicate the confidence of the prediction. The entry can specify a target CPU 305 which is predicted to have the cache line(s) of the region.

The coherent masters 315A-N are coupled to bus/fabric 325, which is representative of any type of interconnect, bus, and/or fabric. When a memory request from CPU 305A is sent to coherent master 315A, if predictor 320A predicts that the data targeted by the request is stored in the cache subsystem 310B-N of another CPU 305B-N, then a speculative probe is generated and sent to the specific target coherent master 315 in parallel with the memory request being forwarded to coherent slave 330 and memory controller 335. It is noted that a speculative probe is different from a demand probe in that a speculative probe can be discarded at any arbitration point in bus/fabric 325 if there is a resource limitation. When the memory request is received by coherent slave 330, a lookup of cache directory 340 is performed to determine if the targeted data is actually stored in a cache of one of the other CPUs 305B-N. It is noted that cache directory 340 can also be referred to as a "probe filter". Cache directory 340 probes the correct CPU 305 or returns data from memory. The response that comes back from the requesting CPU, from memory, or from another cache subsystem determines the accuracy of the prediction generated by predictor 320A. As used herein, a "coherent slave" is defined as an agent that manages coherency by processing received requests and probes that target memory controller 335.

After a lookup of cache directory 340 is complete, cache directory 340 can optionally return back information (e.g., location of data, hit/miss status) to the requesting CPU using a special packet. This special packet can be useful because in a producer consumer type of workload, a request to a page is generally followed by multiple requests to the same page. If the predictor has to wait until the probe response, then a number of subsequent requests will end up missing in the predictor. The special packet can update the predictor earlier, allowing more requests to launch speculative probes and get the benefit of lower latency.

When the speculative probe, generated by predictor 320A, is received by another coherent master 315, the coherent master 315 sends a request to its local CPU 315 for the data. The type of request that is generated by coherent master 315 depends on the coherency state specified by the speculative probe. The request can be for a copy of the data or the request can cause the data to be invalidated. If the local CPU 315 has the data, the data is retrieved and buffered by the coherent master 315 to wait for a demand probe to arrive. When the local CPU 315 has the data, the lookup of cache directory 340 which is performed for the original memory request causes a demand probe to be generated which is sent to the coherent master 315. When the coherent master 315 receives the demand probe, the coherent master 315 retrieves the data out of the buffer and sends the data to coherent master 315A. Then, the predictor 320A increments (i.e., increase by one) the confidence indicator associated with the prediction. If the prediction was incorrect, then when coherent master 315A receives the data from memory or from a different CPU 315 than the one which was targeted by the speculative probe, then predictor 320A decrements (i.e., decrease by one) the confidence indicator associated with the prediction. It should be understood that while the example of CPU 305A generating a memory request and predictor 320A generating a prediction for the request is described above, the other CPUs 305B-N and predictors 320B-N can operate in a similar fashion. Additionally, predictors 320A-N have the ability to prefetch regions. For example, on high confidence hits in a given predictor 320, the requesting coherent master 315 can send out a speculative probe targeting a region. A high confidence hit can refer to a hit to an entry with a confidence indicator higher than a second threshold.

Figure 4:
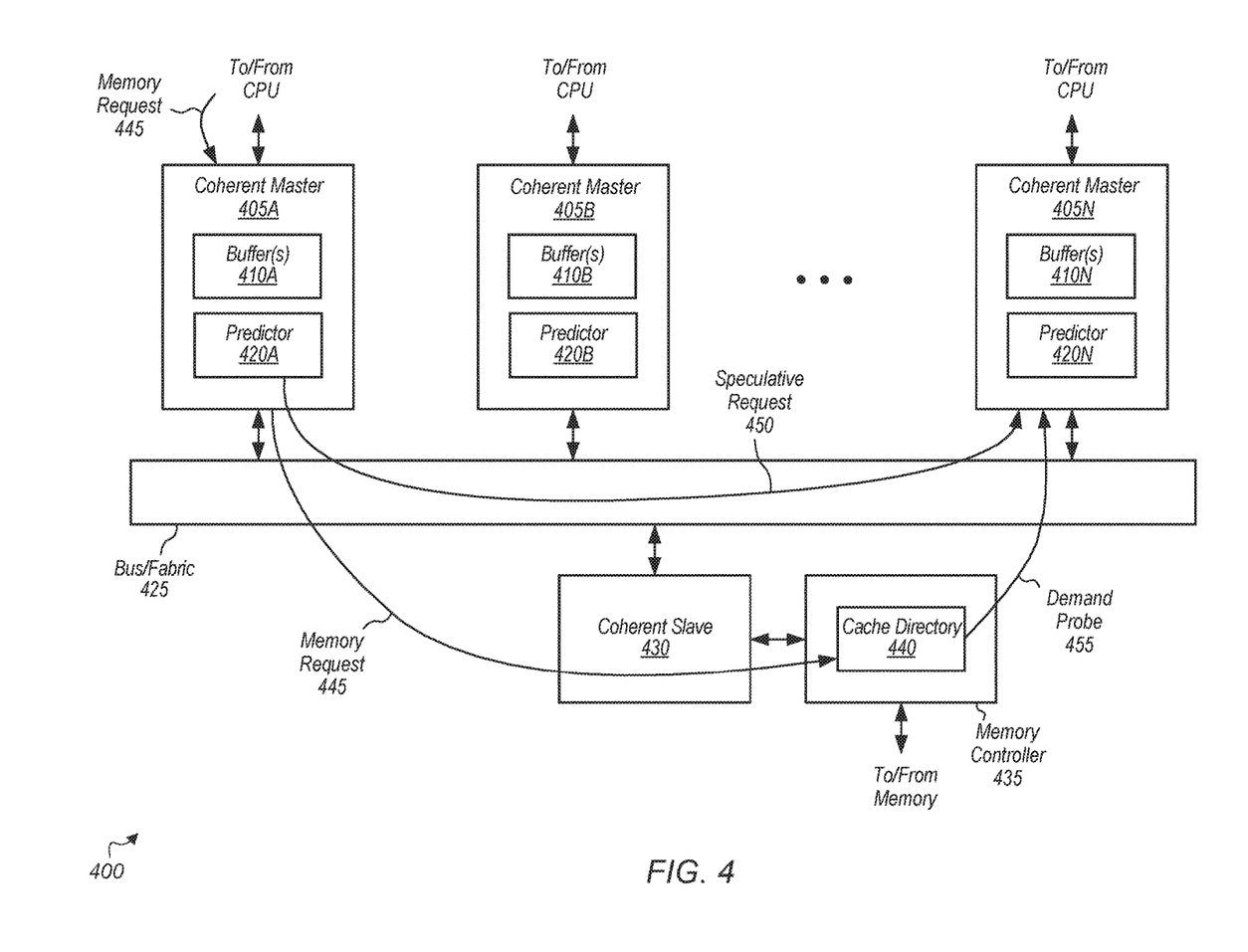
FIG. 4 is a block diagram of one embodiment of an interconnect of a system.

Turning now to FIG. 4, a block diagram of one embodiment of an interconnect 400 of a computing system is shown. In one embodiment, the components of interconnect 400 are included in computing system 100 (of FIG. 1). Interconnect 400 includes at least coherent masters 405A-N, bus/fabric 425, coherent slave 430, and memory controller 435. Coherent masters 405A-N are representative of any number of coherent masters that can be included in interconnect 400. Each coherent master 405A-N is configured to connect to a corresponding CPU or core complex. Each CPU or core complex coupled to a given coherent master 405 can include any number of processor cores.

When a coherent master 405A-N receives a memory request that missed in the cache subsystem of the local CPU, the coherent master 405A-N sends the memory request to its internal predictor 420A-N while also forwarding the memory request to memory controller 435 via bus/fabric 425 and coherent slave 430. It is assumed for the purposes of this discussion that coherent master 405A has received memory request 445 from its local CPU. In response to receiving memory request 445, coherent master 405A forwards memory request 445 to cache directory 440. In parallel with forwarding memory request 445 to cache directory 440, predictor 420A generates a prediction of whether the data targeted by memory request 445 is cached by another CPU in the system. It is assumed for the purposes of this discussion that predictor 420A generates a prediction that the data targeted by memory request 445 is cached by the CPU coupled to coherent master 405N. Accordingly, in response to predictor 420A generating this prediction, coherent master 405A generates and sends speculative probe 450 to coherent master 405N in parallel with forwarding memory request 445 to memory controller 435. If the prediction generated by predictor 420A is correct, then by generating speculative probe 450 in parallel with forwarding memory request 445 to memory controller 435, the latency of waiting for the targeted data is reduced since speculative probe 450 starts the process of retrieving the targeted data earlier than waiting for memory request 445 to be processed by coherent slave 430, memory controller 435, and cache directory 440. In another embodiment, if predictor 420A generates a prediction that the data targeted by the memory request is not cached by another CPU, then coherent master 405A does not generate speculative probe 450. Rather, in this case, coherent master 405A waits for the memory request 445 to be processed and for the data to come back from memory or from another CPU.

When coherent master 405N receives speculative probe 450, coherent master 405N determines if the data targeted by speculative probe 450 is cached by its local CPU. If the data targeted by speculative probe 450 is cached in the local CPU, then coherent master 405N retrieves the data from the CPU. The manner in which the data is retrieved can vary based on the coherency state of speculative probe 450. For example, if speculative probe 450 specifies an exclusive coherency state, then coherent master 405N initiates an early eviction of the data from the cache of its local CPU.

When the targeted data is returned to coherent master 405N, coherent master 405N stores the data in buffer(s) 410N and waits for a corresponding demand probe 455 to arrive. In one embodiment, coherent master 405N sets a timer for this data, and if the timer expires prior to demand probe 455 arriving, then this data is discarded or written back to memory. In this embodiment, if the demand probe 455 is received prior to the timer expiring, the data is retrieved from buffer(s) 410N and sent to coherent master 405A.

The accuracy of predictions generated by predictor 420A are monitored by predictor 420A to help tune the predictions and increase the accuracy of predictions over time. When predictor 420A receives a given memory request, if there is not an entry in predictor 420A for the address targeted by the given memory request, then predictor 420A predicts that the data targeted by the memory request is not cached in another processor's cache. Also, predictor 420A creates a new entry for the address of this given memory request if the data is actually retrieved from another processor's cache. Predictor 420A is configured to monitor traffic and migratory patterns to create predictions for the different regions being accessed by applications executing on its local CPU. Predictor 420A is also configured to monitor requests and probes that are received from other CPUs. For example, if another CPU requests a cache line from the local CPU (i.e., the CPU directly connected to coherent master 405A), predictor 420A stores an entry in the prediction table for this cache line, with the entry identifying the requesting CPU as the prediction target. At a later point in time, if a memory request for this cache line is generated by the local CPU, predictor 420A generates a prediction that this other CPU has the cache line, and a speculative probe is sent to this particular CPU. It is noted that the other predictors 420B-N can function in a similar fashion to the above description of predictor 420A.

Figure 5:
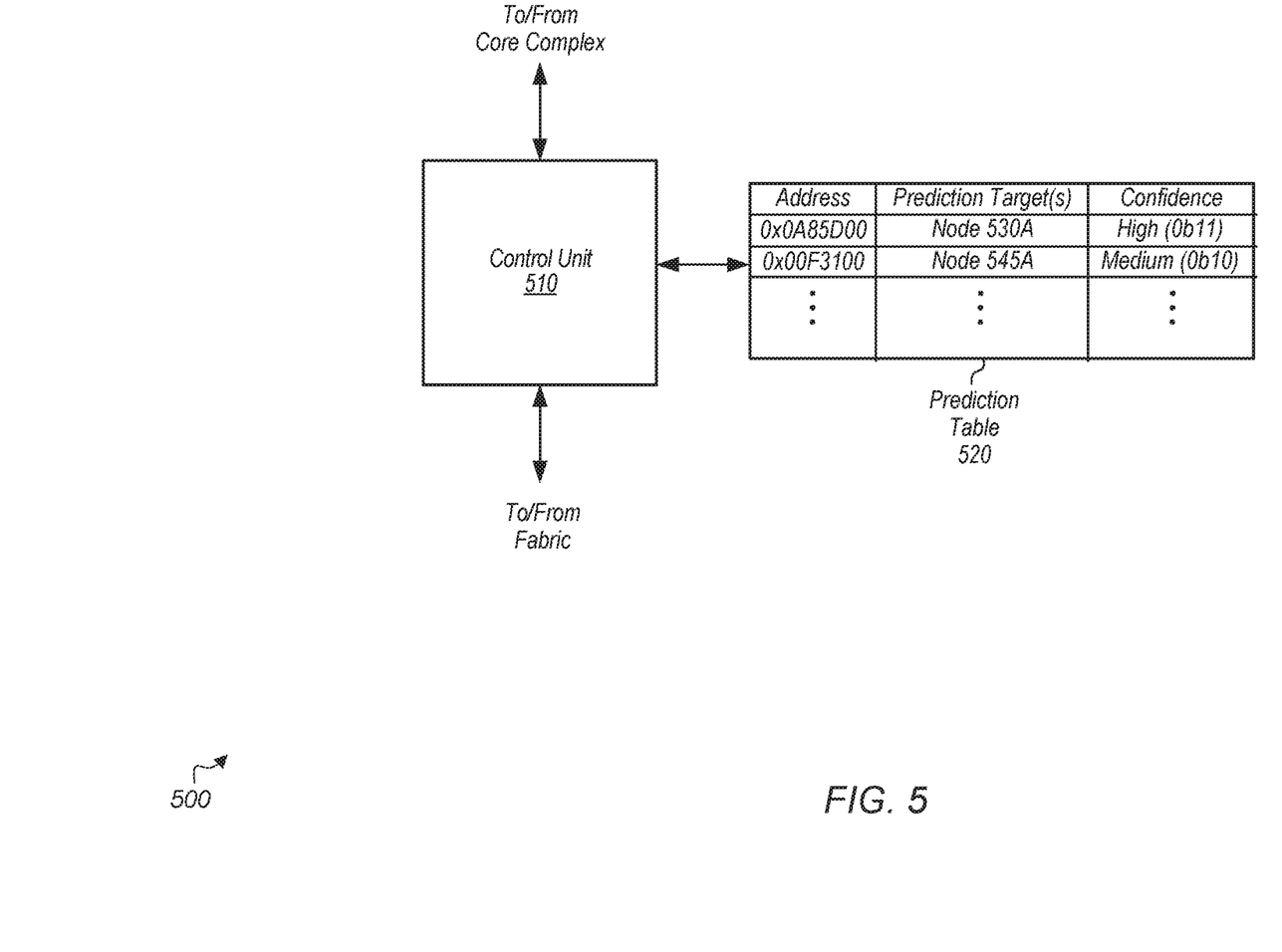
FIG. 5 is a block diagram of one embodiment of a predictor.

Referring now to FIG. 5, a block diagram of one embodiment of a predictor 500 for predicting whether data is cached by another node is shown. In one embodiment, predictor 500 includes at least control unit 510 and prediction table 520. In one embodiment, the logic of predictor 500 is included in each of predictors 320A-N of system 300 (of FIG. 3). In another embodiment, the logic of predictor 500 is included in predictors 420A-N of interconnect 400 (of FIG. 4).

Control unit 510 is configured to monitor requests that are generated by the local core complex which are sent out on the fabric to the memory controller and to other remote core complexes. Control unit 520 utilizes the information obtained by monitoring traffic to populate entries in prediction table 520 with predictions on where the data of certain addresses is likely to be cached in the system. For example, control unit 510 stores an entry for a first address which has a first prediction target (e.g., a first node) and a given confidence indicator. In one embodiment, each entry of prediction table 520 includes an address field, prediction target field(s), and a confidence field. The prediction target field(s) store the last N targets for the cache line, with N a positive integer and with N varying from embodiment to embodiment.

In one embodiment, if a request or probe is received by the host coherent master from a given node requesting a given line, then control unit 510 creates an entry in prediction table 520 for the address of this given line. Control unit 510 stores an ID of the given node as the prediction target in this entry, and then control unit 520 can initializes the confidence field of the entry to a default value. Also, in one embodiment, if a request is generated by the local node, and the line targeted by the request is ultimately retrieved from a specific remote node, then control unit 510 creates a new entry for this line. This new entry includes the specific remote node as the prediction target, with the confidence field initialized to a default value. In other embodiments, control unit 510 utilizes other suitable techniques for creating new entries to populate prediction table 520.

When a memory request generated by the local node is received by the coherent master, the coherent master conveys the memory request to control unit 510 to perform a lookup of prediction table 520. While the memory request is conveyed to control unit 510 to perform a lookup of prediction table 520, the memory request is also forwarded to the memory controller in parallel with the lookup to prediction table 520. If the lookup is a hit to an entry of prediction table 520, then control unit 510 compares the confidence field of the hit entry to a threshold. If the confidence field is greater than the threshold, then control unit 510 sends a speculative probe to the node(s) indicated in the prediction target(s) field of the hit entry. If the prediction is correct, and the data is retrieved from the target indicated in the matching entry, then the confidence indicator is increased (e.g., incremented). However, if the prediction is incorrect, and the data targeted by the request is retrieved from a different node or from memory, then the confidence indicator is decreased (e.g., decremented). If the data targeted by the request is retrieved from the cache subsystem of a different node than the one identified in a matching entry of table 520, then an ID of this node is stored in the prediction target(s) field of the corresponding entry. It is noted that the above techniques described for predictor 500 are indicative of one particular embodiment. In other embodiments, other suitable techniques for monitoring traffic, making predictions, and generating speculative probes based on the predictions are possible and are contemplated.

Figure 6:
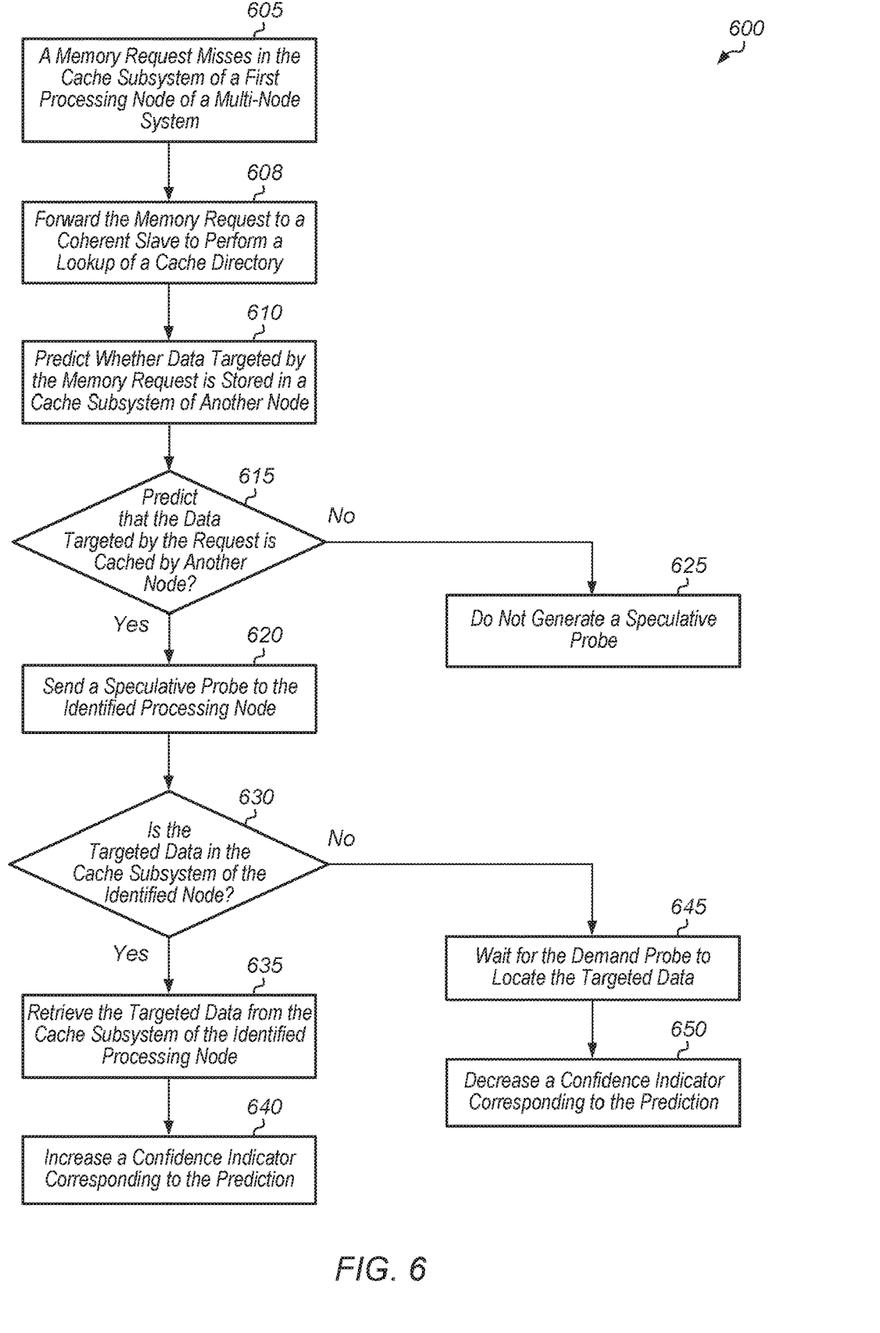
FIG. 6 is a generalized flow diagram illustrating one embodiment of a method for accelerating cache to cache data transfers.
Figure 7:
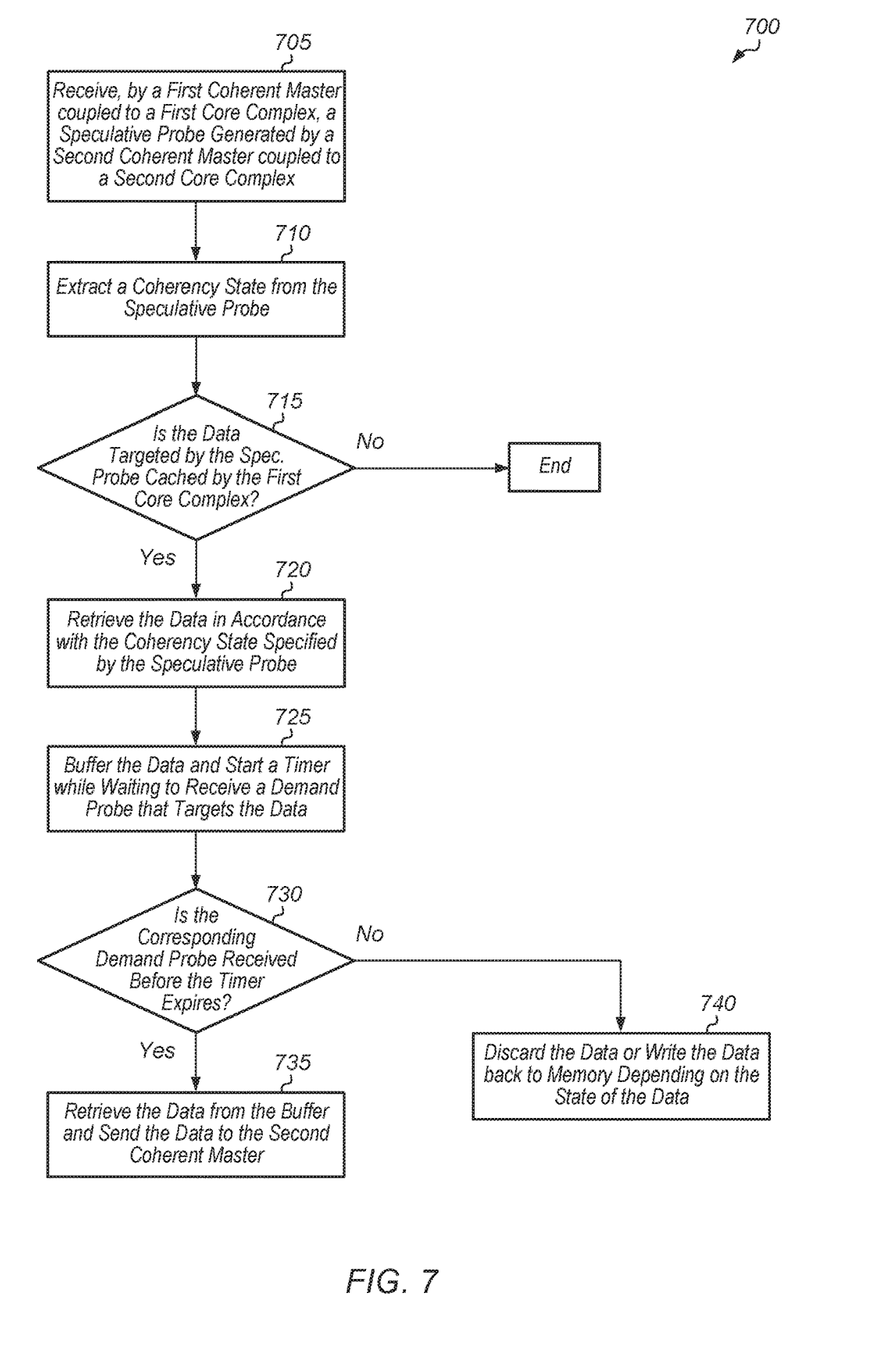
FIG. 7 is a generalized flow diagram illustrating one embodiment of a method for a coherent master processing a received speculative probe.
Figure 8:
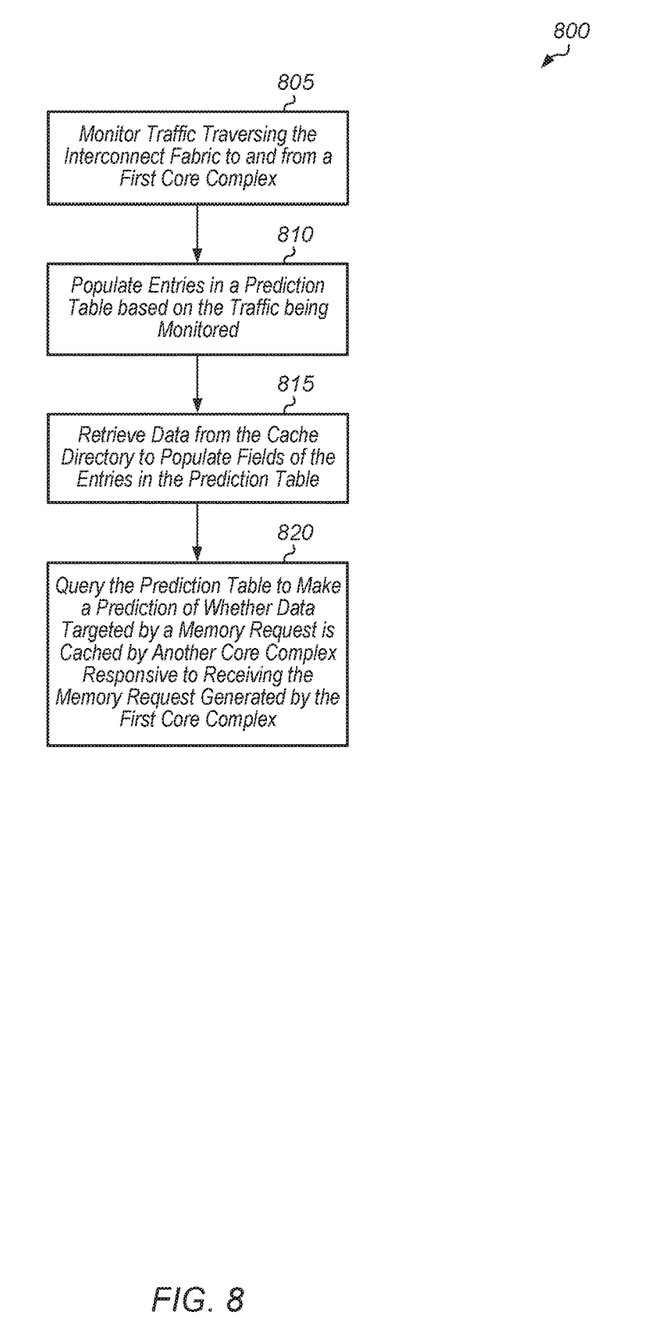
FIG. 8 is a generalized flow diagram illustrating one embodiment of a method for building a prediction unit.
Figure 9:
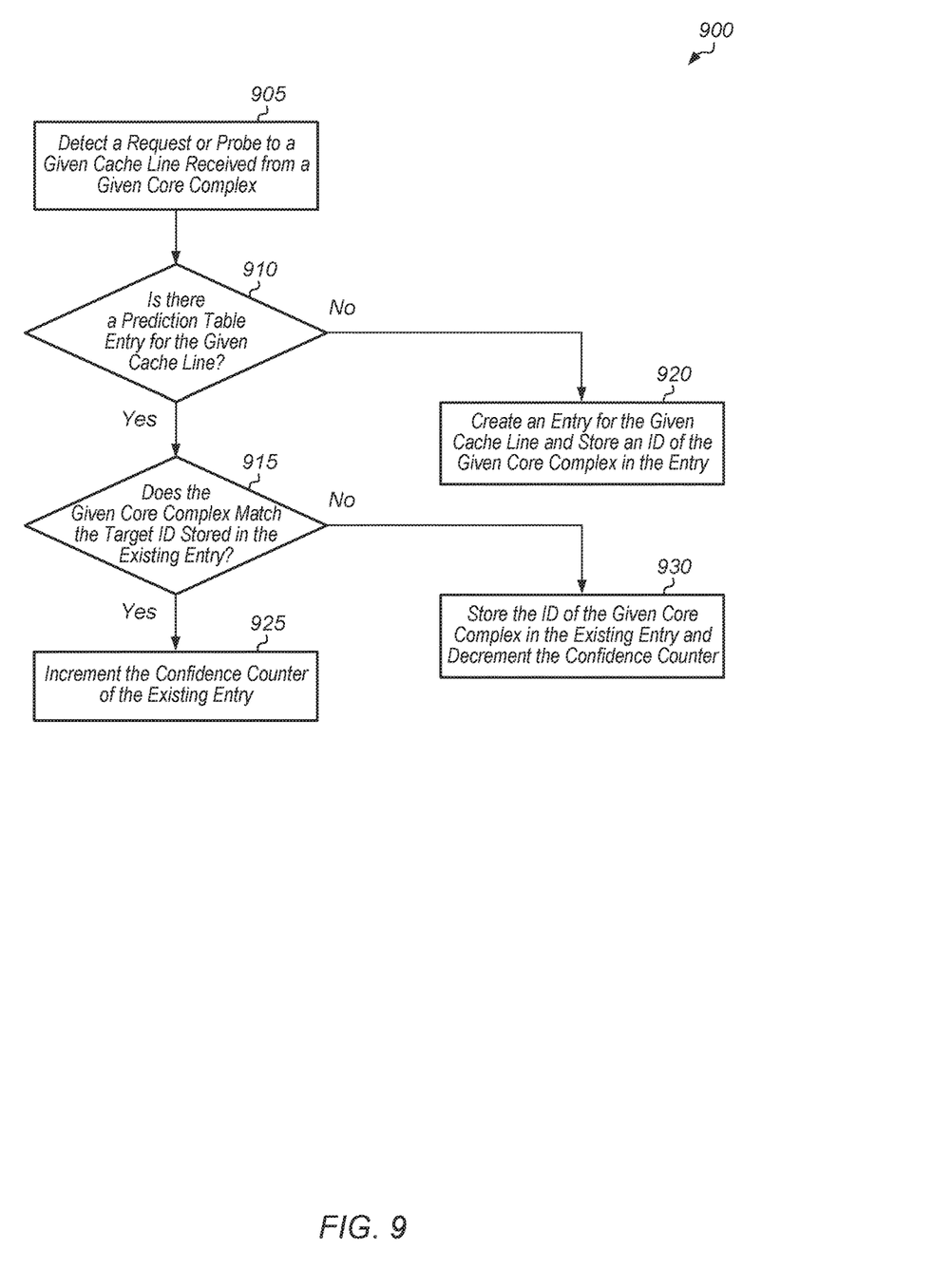
FIG. 9 is a generalized flow diagram illustrating one embodiment of a method for operating a predictor.

Turning now to FIG. 6, one embodiment of a method 600 for accelerating cache to cache data transfers is shown. For purposes of discussion, the steps in this embodiment and those of FIG. 7-9 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 600.

A memory request misses in the cache subsystem of a first processing node of a multi-node system (block 605). In response to the memory request missing in the cache subsystem of the first processing node of the multi-node system, the memory request is forwarded to a coherent slave to perform a lookup of a cache directory (block 608). In parallel with block 608, a prediction unit in a coherent master predicts whether data targeted by the memory request is stored in a cache subsystem of another processing node (block 610). If the prediction unit predicts that the data targeted by the memory request is stored in a cache subsystem of another processing node (conditional block 615, "yes" leg), then the prediction unit sends a speculative probe to the identified processing node (block 620). As used herein, a "probe" is defined as a message passed from a coherency point in the system to one or more caches in the computer system to determine if the caches have a copy of a block of data and optionally to indicate the state into which the cache should place the block of data. If the prediction unit predicts that the data targeted by the memory request is not stored in a cache subsystem of another processing node (conditional block 615, "no" leg), then the prediction does not generate a speculative probe (block 625).

If the targeted data is in the cache subsystem of the identified processing node (conditional block 630, "yes" leg), then the data is retrieved from the cache subsystem of the identified processing node (block 635). In one embodiment, the data retrieved from the cache subsystem is buffered by the local coherent master, and the local coherent master waits until a demand probe is received before sending the data to the first processing node. By initiating the process of retrieving the data ahead of the demand probe, latency is reduced and the first processing node will end up receiving the data faster than it otherwise would have. When the first processing node eventually receives the data retrieved from the cache subsystem of the identified processing node, the prediction unit increases a confidence indicator corresponding to the prediction (block 640). After block 640, method 600 ends.

If the targeted data is not in the cache subsystem of the identified processing node (conditional block 630, "no" leg), then the system waits for the demand probe to locate the targeted data (block 645). When the first processing node eventually receives the data, the prediction unit decreases a confidence indicator corresponding to the prediction (block 650). After block 650, method 600 ends. The targeted data can be retrieved from memory or retrieved the cache subsystem of a different processing node which was not identified by the prediction unit. If the targeted data was retrieved from the cache subsystem of another processing node, the prediction unit stores an ID of this processing node in the corresponding entry in a prediction table to be used for future predictions.

Referring now to FIG. 7, one embodiment of a method 700 for a coherent master processing a received speculative probe is shown. A first coherent master coupled to a first core complex receives a speculative probe generated by a second coherent master coupled to a second core complex (block 705). It is noted that a "coherent master" can also be referred to a "coherent master unit". It is also noted that a "core complex" can also be referred to as a "processing node".

Next, the first coherent master extracts a coherency state (e.g., exclusive, shared) from the speculative probe (block 710). Also, the first coherent master determines if the data targeted by the speculative probe is cached by the first core complex (conditional block 715). In one embodiment, the first coherent master has a tag structure identifying lines cached by the first core complex, and the first coherent master queries this tag structure to determine if the data targeted by the speculative probe is cached by the first core complex. In another embodiment, the first coherent master forwards the speculative probe to the first core complex, and the first core complex determines whether the data targeted by the speculative probe request is cached in its cache subsystem. If the data targeted by the speculative probe is cached by the first core complex (conditional block 715, "yes" leg), then the first coherent master retrieves the data in accordance with the coherency state specified by the speculative probe (block 720). If the data targeted by the speculative probe is not cached by the first core complex (conditional block 715, "no" leg), then method 700 ends.

After retrieving the data, the first coherent master buffers the data and starts a timer while waiting to receive a demand probe that targets the data (block 725). If the corresponding demand probe is received before the timer expires (conditional block 730, "yes" leg), the first coherent master retrieves the data from the buffer and sends the data to the second coherent master (block 735). If the corresponding demand probe is not received before the timer expires (conditional block 730, "no" leg), then the first coherent master discards the data or writes the data back to memory depending on the state of the data (block 740). For example, if the data has been modified by the first core complex and the data has already been invalidated in the cache subsystem, then the first coherent master writes the data back to memory in block 740. After blocks 735 and 740, method 700 ends.

Turning now to FIG. 8, one embodiment of a method 800 for building a prediction unit is shown. A coherent master monitors traffic traversing the interconnect fabric to and from a first core complex (block 805). For example, the traffic monitored by the coherent master includes memory requests and probes generated by the first core complex, probes received by the first core complex, and cache lines transferred out of the first core complex to another core complex. Next, the coherent master populates entries in a prediction table based on the traffic being monitored (block 810). For example, in one embodiment, each entry includes an address, a target which is predicted to cache the data of the corresponding address, and a confidence indicator. Also, the coherent master retrieves data from the cache directory to populate fields of the entries in the prediction table (block 815). For example, in one embodiment, when the coherent master receives a memory request generated by the first core complex that targets a first cache line, the coherent master queries the cache directory for information regarding cache lines adjacent to the first cache line. When the coherent master receives a memory request generated by the first core complex, the coherent master queries the prediction table to make a prediction of whether data targeted by the memory request is cached by another core complex (block 820). After block 820, method 800 ends.

Referring now to FIG. 9, one embodiment of a method 900 for operating a predictor is shown. A predictor of a first core complex detects a request or probe to a given cache line received from a given core complex (block 905). It is assumed for the purposes of this discussion that the predictor is part of a coherent master connected directly to a first core complex, and it is assumed that the given core complex is a different core complex within the computing system. It is also assumed that the given core complex sent the request or probe to the first core complex. If there is already a prediction table entry for the given cache line (conditional block 910, "yes" leg), then the predictor determines if the given core complex matches the target ID stored in the existing entry (conditional block 915). In one embodiment, each entry stores a single target ID. However, in another embodiment, each entry stores multiple target IDs. In this embodiment, the predictor determines if the given core complex matches the most recent target ID stored in the existing entry. If there is not a prediction table entry for the given cache line (conditional block 910, "no" leg), then the predictor creates an entry for the given cache line and stores an ID of the given core complex in the entry (block 920). In one embodiment, the predictor sets the confidence indicator of the new entry to a default value. After block 920, method 900 ends.

If the given core complex matches the target ID stored in the existing entry (conditional block 915, "yes" leg), then the predictor increments the confidence counter of the existing entry (block 925). After block 925, method 900 ends. If the given core complex does not match the target ID stored in the existing entry (conditional block 915, "no" leg), then the predictor stores the ID of the given core complex in the existing entry and decrements the confidence counter (block 930). After block 930, method 900 ends. It is noted that method 900 can be performed by the predictor each time a request or probe to a given cache line is received by the first core complex from another core complex.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
  a plurality of processing nodes, wherein each processing node comprises one or more processors and a cache subsystem;
  a first prediction unit coupled to a first processing node, wherein the first prediction unit is configured to:
    receive a memory request from the first processing node; and
    cause a speculative probe to be sent to a second processing node responsive to predicting that data targeted by the memory request resides in a cache subsystem of the second processing node;
    wherein the second processing node is configured to:
      receive the speculative probe;
      retrieve the data responsive to determining that the data targeted by the speculative probe is cached in a cache subsystem of the second processing node;
      store the retrieved data in a buffer until a demand probe arrives;
      start a timer; and
      discard the data if the timer expires before a demand probe targeting the data is received.

2. The system as recited in claim 1, further comprising:
  an interconnect fabric configured to discard the speculative probe responsive to detecting a lack of communication resources;
  a memory controller; and
  a first coherent master unit coupled to the first processing node, wherein the first coherent master unit is configured to forward the memory request to the memory controller in parallel with sending the speculative probe to the second processing node.

3. The system as recited in claim 1, further comprising an interconnect fabric, wherein responsive to detecting a resource limitation, the interconnect fabric is configured to:
  allow discarding of a speculative probe; and
  disallow discarding of a demand probe.

4. The system as recited in claim 1, wherein the first prediction unit is further configured to:
  perform a lookup of a prediction table with an address of the memory request;
  retrieve a confidence indicator from a first entry of the prediction table responsive to the lookup matching the first entry; and
  generate the speculative probe responsive to the confidence indicator being greater than a threshold.

5. The system as recited in claim 1, wherein the system comprises a cache directory, and wherein the system is further configured to send the memory request to a cache directory to determine whether the prediction is correct.

6. The system as recited in claim 1, wherein the first prediction unit is further configured to:
  monitor data transfers out of a cache subsystem of the first processing node;
  retrieve information from a cache directory; and
  generate predictions on whether memory requests target data cached in other processing nodes based on monitoring the data transfers out of the cache subsystem and the information retrieved from the cache directory.

7. A method comprising:
  receiving a memory request from a first processing node;
  generating a prediction of whether data targeted by the memory request resides in a cache subsystem of another processing node of a plurality of processing nodes; and
  causing a speculative probe to be sent to a second processing node responsive to predicting that the data targeted by the memory request resides in a cache subsystem of the second processing node;
  the second processing node:
    receiving the speculative probe;
    retrieving the data responsive to determining that the data targeted by the speculative probe is cached in a cache subsystem of the second processing node;
    storing the retrieved data in a buffer until a demand probe arrives;
    starting a timer; and
    discarding the data if the timer expires before a demand probe targeting the data is received.

8. The method as recited in claim 7, further comprising:
  discarding the speculative probe responsive to detecting a lack of communication resources; and
  forwarding, by a first coherent master unit coupled to the first processing node, the memory request to the memory controller in parallel with sending the speculative probe to the second processing node.

9. The method as recited in claim 7, wherein in response to detecting a resource limitation, the method further comprises:
  allowing, by an interconnect fabric between at least the first processing node and the second processing node, a speculative probe to be discarded; and
  disallowing, by the interconnect fabric, a demand probe from being discarded.

10. The method as recited in claim 7, further comprising:
  performing a lookup of a prediction table with an address of the memory request;
  retrieving a confidence indicator from a first entry of the prediction table responsive to the lookup matching the first entry; and
  generating the speculative probe responsive to the confidence indicator being greater than a threshold.

11. The method as recited in claim 7, further comprising sending the memory request to a cache directory to determine whether the prediction is correct.

12. The method as recited in claim 7, further comprising:
  monitoring data transfers out of a cache subsystem of the first processing node;
  retrieving information from a cache directory; and
  generating predictions on whether memory requests target data cached in other processing nodes based on monitoring the data transfers out of the cache subsystem and the information retrieved from the cache directory.

13. An apparatus comprising:
a first processing node comprising one or more processors and a cache subsystem; and
a first coherent master unit comprising a first prediction unit, wherein the first prediction unit is configured to:
receive a memory request from the first processing node;
cause a speculative probe to be sent to a second processing node responsive to predicting that data targeted by the memory request resides in a cache subsystem of the second processing node;
wherein the second processing node is configured to:
receive the speculative probe;
retrieve the data responsive to determining that the data targeted by the speculative probe is cached in a cache subsystem of the second processing node;
store the retrieved data in a buffer until a demand probe arrives;
start a timer; and
discard the data if the timer expires before a demand probe targeting the data is received.

14. The apparatus as recited in claim 13, wherein the first coherent master unit is configured to forward the memory request to the memory controller in parallel with sending the speculative probe to the second processing node.

15. The apparatus as recited in claim 13, wherein the first prediction unit is further configured to:
perform a lookup of a prediction table with an address of the memory request;
retrieve a confidence indicator from a first entry of the prediction table responsive to the lookup matching the first entry; and
generate the speculative probe responsive to the confidence indicator being greater than a threshold.

16. The apparatus as recited in claim 13, wherein the first coherent master unit is configured to receive a response from memory or another coherent master unit which indicates whether the prediction is correct.

17. The apparatus as recited in claim 16, wherein the first prediction unit is configured to:
increment the confidence indicator responsive to receiving an indication that the prediction is correct; and
decrement the confidence indicator responsive to receiving an indication that the prediction is incorrect.

18. The apparatus as recited in claim 13, wherein the first prediction unit is further configured to:
monitor data transfers out of a cache subsystem of the first processing node;
retrieve information from a cache directory; and
generate predictions on whether memory requests target data cached in other processing nodes based on monitoring the data transfers out of the cache subsystem and the information retrieved from the cache directory.

* * * * *